(No Model.)
H. H. SPEARS.
GRASS SEED HARVESTER.
No. 255,347. Patented Mar. 21, 1882.
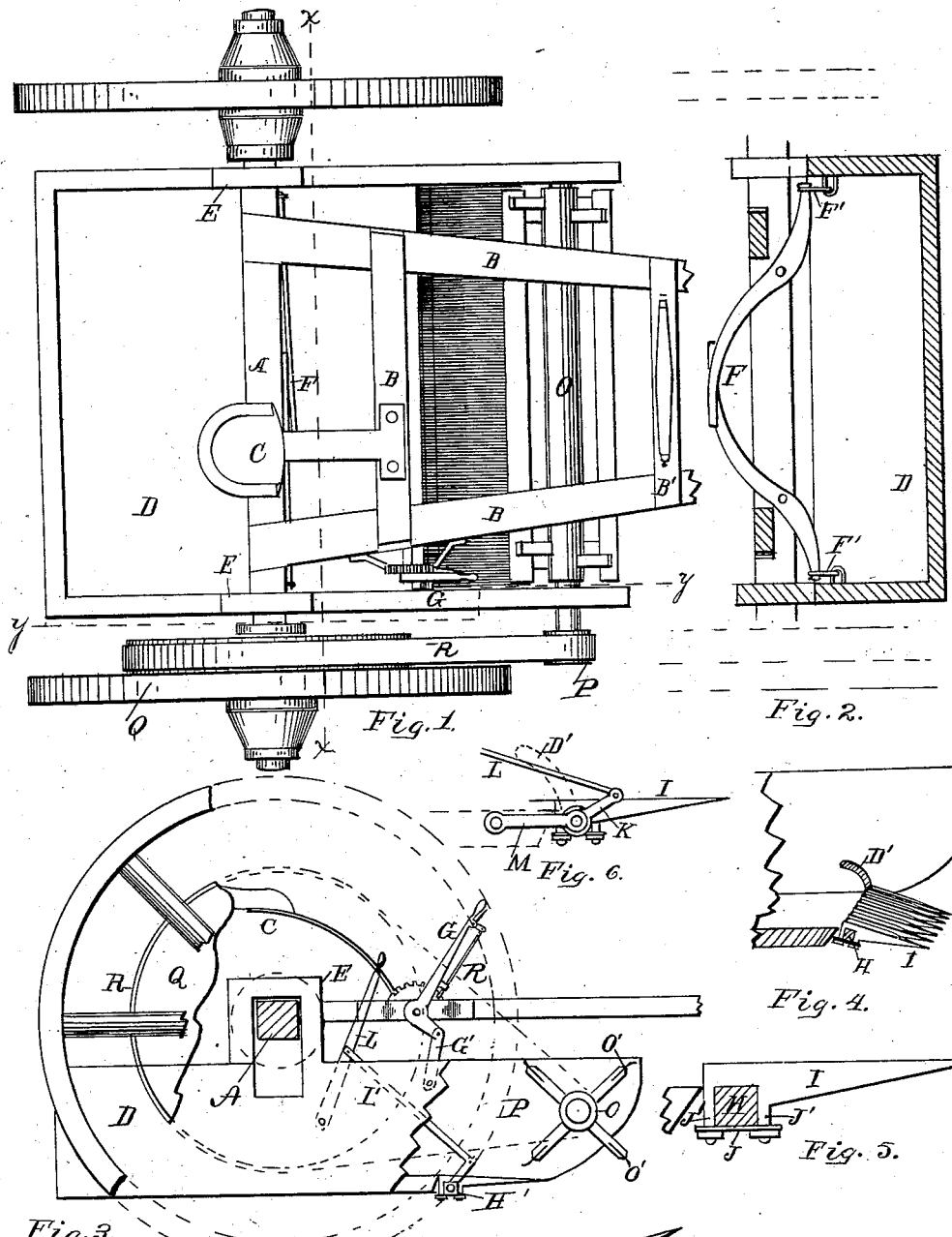
Witnesses:
O. J. Bailey
J. W. Kinsey
Inventor:
Henry H. Spears

UNITED STATES PATENT OFFICE.

HENRY H. SPEARS, OF PARIS, KENTUCKY.

GRASS-SEED HARVESTER.

SPECIFICATION forming part of Letters Patent No. 255,347, dated March 21, 1882.

Application filed January 23, 1882. (No model.)

*To all whom it may concern:*

Be it known that I, HENRY H. SPEARS, of Paris, in the county of Bourbon and State of Kentucky, have invented a new and useful Improvement in Grass-Seed Harvesters, which improvement is fully set forth in the following specification and accompanying drawings, in which—

Figure 1 is a top view of the stripper. Fig. 2 is a transverse section through the line $x\ x$, Fig. 1. Fig. 3 is a side elevation, partly in section, through the line $y\ y$ of Fig. 1. Fig. 4 is a perspective view of a portion of the stripping-teeth and the body. Fig. 5 is an enlarged side view of the teeth and tooth-bar; Fig. 6, a side view of the bar and method of adjusting same, and Fig. 7 a perspective view of the same.

The object of my invention is an improvement in blue grass-seed harvesters.

Referring to the accompanying drawings, A represents the axle, and B the main frame, of the harvester, having suitable cross-pieces, B'. The main pieces B may be extended forward and constitute the shafts. The frame and axle are therefore secured together permanently.

C is a seat for the driver.

The body or bed D of the harvester is suspended beneath the axle by means of the guides or arches E. These guides or arches permit sufficient play for the axle, so that the body can be raised or lowered a suitable distance. The body is regulated or raised and depressed by means of the two levers F, hinged to the forward face of the axle, so that the operating ends of the levers meet centrally, and the projecting ends of the levers pass down beneath the frame B, and are attached to the body D by means of the links F'.

On the side of the frame-piece B is a bell-crank lever, G, the lower limb of which is provided with the link G', which is connected with the body B at a point forward of the axle. The object of this is to provide a means for elevating or depressing the forward end of the body without resorting to the transverse levers F, or to be used in conjunction with the latter levers. The floor of the body is somewhat shorter than the sides, and at the forward end, and parallel therewith, is a bar, H, having journals H' projecting from the ends, which journals rest in the curved slots D' of the body. This bar is square, or may be made in any suitable form, so that the teeth I can be conveniently attached thereto. Each of these teeth I is in cross section of a generally triangular form, and in side elevation has the general shape shown in Figs. 5 and 7. The rear portion is of a prismatic shape, while in the front portion the sides and bottom converge to a point. As shown in Figs. 4 and 7, the rear ends of the teeth are cut out to fit the bar H, and a yoke, J, is placed under the bar, transversely over the lugs J' J', secured by the nuts, thereby enabling the user to readily remove a tooth when damaged or when it is desired to sharpen the same.

K is a crank attached to one end of the bar H. This crank is operated by means of the lever L through the connecting-rod L'.

M is an arm or link, the forward end of which forms a bearing for the journal H', and at the rear end this arm is pivoted to the body.

N is a stop on the outer face of the crank K, so that when the lever L draws back the crank K the bar H will revolve until the stop strikes the upper edge of the arm M, when the bar containing the teeth will be raised and swung with the arm N.

O is a transverse shaft journaled in the forward end of the body, above the teeth. This shaft is provided with a reel, O', designed to strike the seed-heads as they approach the teeth. The wings of the reel are curved or cupped, so as to produce a breeze as it rapidly revolves, thus forcing the heads toward or in the direction of the teeth. The shaft O is provided at one end with a pulley, P. The drive-wheel is also provided with a larger pulley, Q, and power is transmitted through the belt R from pulley Q to pulley P. In lieu of this belt and the pulleys, a chain and sprocket-wheels may be employed.

The teeth I are peculiarly shaped, as shown more fully in Fig. 7. The upper face of the rear portion of the tooth has parallel sides, while the forward portion of the tooth has the sides converging toward each other, so as to form a point. When placed on a bar they are secured thereto slightly apart from each other, so as to permit the grass-stem to pass between, but at the same time are too near each other to permit the heads to pass.

The operation of the machine is as follows: Figs. 1 and 2 show the stripper in position for operating. As it proceeds forward the reel turns rapidly in the direction of the drive-wheel, striking or blowing the seed-heads and forcing them between the teeth. The teeth are near enough to each other to prevent the smallest heads from passing down and being lost. When the seeds are stripped they are pushed back into the body D by an operator, who sits in the body for that purpose. The points of the teeth may be elevated or depressed by means of the lever L. When passing over an obstruction, or when the increased height of the grass-seed demands it, the bell-crank lever G is employed.

The principle object of the curved slots D' and the lever L is to provide a means whereby the operator can elevate the teeth and bar from the end of the floor when it is desired to replace the teeth.

Having described my invention, what I claim is—

1. In a grass-seed harvester, the tooth I, as described, having lugs J' J', combined with the bar H and yoke J, substantially as set forth.

2. In a grass-seed harvester, the body D, suspended, as described, below the axle, combined with cross-levers F F, links F' F', and side lever, G, substantially as set forth.

3. In a grass-seed harvester, the bar H, journaled in the arms M, and provided with the crank K, having the stop N, in combination with the lifting-lever and connecting-link, whereby the bar may be partially rotated and afterward raised by the motion of the same lever, substantially as set forth.

4. In a grass-seed harvester, the combination of the body D, having guides or arches E, the reel O', the transverse toothed bar H, journaled to the arms M, and having the crank K, the lever L, link L', the levers F F and G, the drive-wheels provided with the pulley Q, and the belt R, substantially as and for the purposes set forth.

In testimony that I claim the foregoing I have hereunto set my hand this 18th day of January, 1882, in the presence of witnesses.

HENRY H. SPEARS.

Witnesses:
J. E. SPEARS,
DUDLEY TALBOT.